US008305386B2

(12) United States Patent
Gillespie et al.

(10) Patent No.: US 8,305,386 B2
(45) Date of Patent: Nov. 6, 2012

(54) BIOS GRAPHICAL ENGINE PROVIDING UNIFORM LOOK AND FEEL

(75) Inventors: Kurt D. Gillespie, Houston, TX (US); Jayne E. Scott, Sugar Land, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 238 days.

(21) Appl. No.: 12/747,571

(22) PCT Filed: Jan. 9, 2008

(86) PCT No.: PCT/US2008/050581
§ 371 (c)(1),
(2), (4) Date: Jun. 11, 2010

(87) PCT Pub. No.: WO2009/088509
PCT Pub. Date: Jul. 16, 2009

(65) Prior Publication Data
US 2010/0271388 A1   Oct. 28, 2010

(51) Int. Cl.
*G09G 5/00* (2006.01)
(52) U.S. Cl. ........ 345/581; 345/589; 345/619; 345/636; 715/744; 715/747; 715/762; 715/763; 715/866; 713/1; 713/2

(58) Field of Classification Search .................. None
See application file for complete search history.

(56) References Cited

U.S. PATENT DOCUMENTS

| 6,757,838 | B1 | 6/2004 | Chaiken et al. |
| 6,906,721 | B1 * | 6/2005 | Burrell ........................ 345/581 |
| 7,191,328 | B2 | 3/2007 | Hobson |
| 2005/0120361 | A1 | 6/2005 | Bailey et al. |
| 2005/0246645 | A1 | 11/2005 | Beam et al. |

OTHER PUBLICATIONS

International Search Report & Written Opinion dated Sep. 26, 2008, pp. 10.

* cited by examiner

Primary Examiner — Antonio A Caschera (57) ABSTRACT

A computer system comprises a Basic Input/Output System ("BIOS") graphical engine and a BIOS graphics look and feel module. The BIOS graphics look and feel module is separate from the BIOS graphical engine, and comprises a look and feel definition that defines the appearance and behavior of BIOS graphical user interface displays presented to a user before an operating system acquires control of the system. The BIOS graphical engine transforms information to be displayed for a user in accordance with the look and feel definition to provide a uniform appearance and behavior to graphical displays provided to the user.

17 Claims, 6 Drawing Sheets

BIOS GRAPHICAL ENGINE PROVIDING UNIFORM LOOK AND FEEL

BACKGROUND

Computers typically comprise executable code referred to as the Basic Input/Output System ("BIOS") code. The BIOS code is executed to initialize (boot-up) the computer and transfer control to an operating system, such as Microsoft® Windows® or Linux. Additionally, the BIOS tests the computer's hardware to ensure proper operation, locates specialized BIOS code residing on peripherals (e.g., graphics BIOS on a graphics board), and provides various interfaces to low-level functions of the computer such as access to storage drives, interaction with input devices, etc. for use by the operating system.

The BIOS is typically stored in a Read-Only-Memory ("ROM") or Flash memory device addressable by the computer's processor at reset. While these devices provide access to the BIOS program to boot-up the computer, they also restrict the amount of memory available for BIOS storage.

The BIOS typically interacts with the computer user through a primitive textual interface, rather than the graphical interface users have come to expect when operating a modern computer. Through the BIOS user interface, the computer user can access and modify a variety of system settings. Examples of such settings include system date and time, drive configuration, security settings, power management settings, and memory timing. Additionally, the BIOS may perform user authentication by entry of a password, or through biometrics, such as fingerprint scanning. While textual interfaces are relatively easy to develop and consume few system resources, computer users have become accustomed to the simplicity and visual appeal of graphical interfaces. Thus, a flexible BIOS graphical interface that makes efficient use of memory and computational resources is desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a collection of two or more hardware and/or software components, and may be used to refer to an electronic device or devices, or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
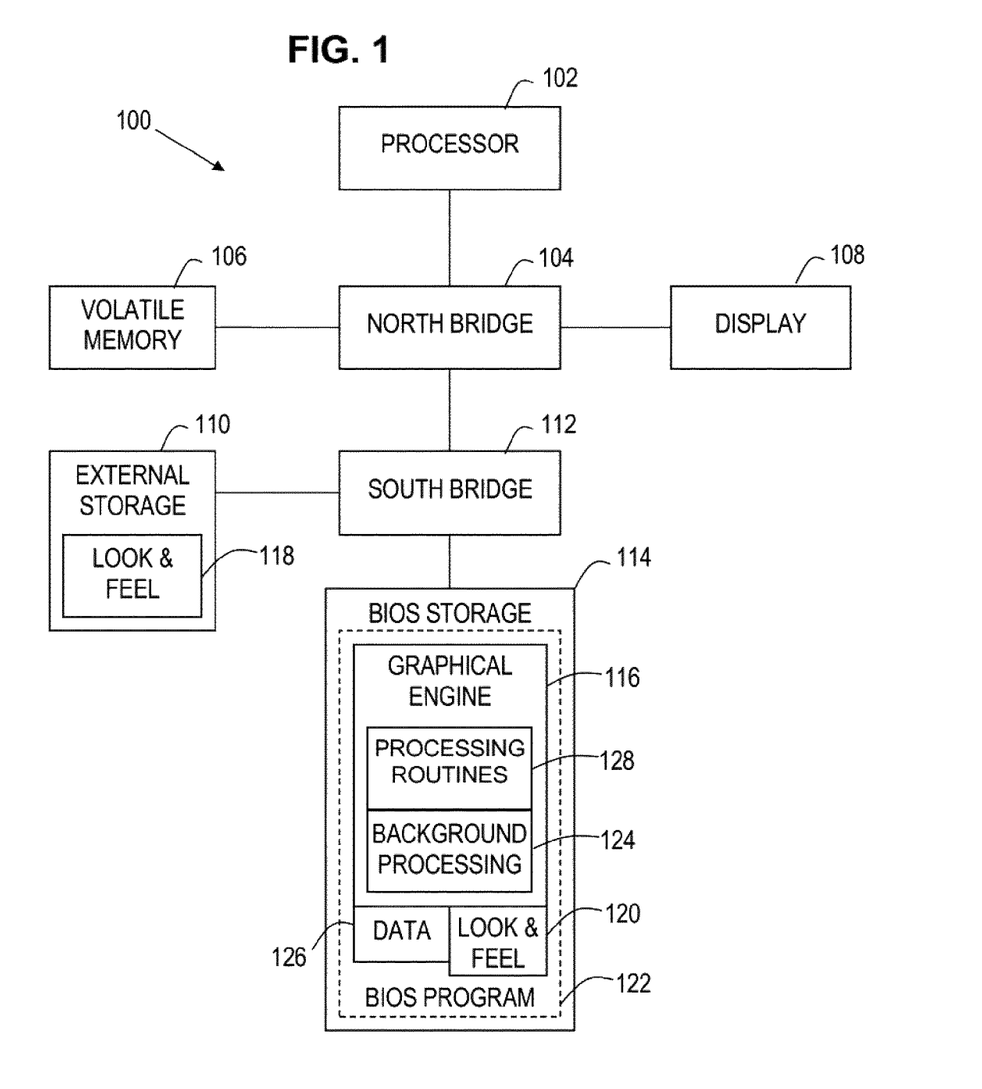
FIG. 1 shows a block diagram of a system comprising a BIOS graphical user interface featuring customizable unified look and feel in accordance with various embodiments.

FIG. 1 shows a block diagram of a system comprising a BIOS graphical user interface having a customizable unified "look and feel" in accordance with various embodiments. "Look and feel," as used in the present disclosure, refers to the appearance and operation of the user interface. Unified look and feel refers to consistency of appearance and operation across user interface displays. Such consistency makes the graphical interface easier to learn and use, and provides a sense of completeness to the interface. The system 100 comprises a processor 102, a north bridge 104, and a south bridge 112. Various embodiments may implement north and south bridges 104, 112 as separate components or as a single component. The system 100 also comprises volatile memory 106, typically Dynamic Random Access Memory ("DRAM"); however, Static Random Access Memory ("SRAM"), or other suitable random access memory technology may also be used. Display 108 provides visual information to a user. A Liquid Crystal Display, Cathode Ray Tube display, plasma display, Organic Light Emitting Diode display, electroluminescent display, projection display, or other display technology used to display text and graphics for a user may be employed.

Basic Input/Output System ("BIOS") storage 114 comprises a BIOS program 122 for booting the computer and transferring control to an operating system, such as Linux or Microsoft® Windows®. The term BIOS as used herein is intended to encompass a variety of boot, initialization, and operating system start-up programs known to those of skill in the art, including such programs based on the Unified Extensible Firmware Interface ("UEFI"). BIOS storage 114 may be implemented as a Read Only Memory ("ROM") having its contents fixed at manufacture, a FLASH memory whose contents may be modified post-manufacture, or other type of non-volatile memory suitable for storing BIOS, for example, Programmable ROM ("PROM"), Electrically Erasable PROM ("EEPROM"), Magnetoresistive Random Access Memory ("MRAM"), or Ferroelectric memory. Some embodiments execute the BIOS program 122 directly from BIOS Storage 114. Other embodiments copy all or a portion of the BIOS program 122 from BIOS Storage 114 to Volatile Memory 106 for execution.

External Storage 110 provides storage for program and data elements apart from the BIOS Storage 114. External Storage 110 typically comprises a hard drive, but more generally may comprise a FLASH drive or any other non-volatile storage medium separate from the BIOS Storage 114. Thus, "External Storage" as used herein refers to a data storage device outside of BIOS Storage 114. External Storage 110 is accessible (write, read, etc.) to a user via operating system file accesses. In contrast, the BIOS Storage 114 writes are restricted to specialized BIOS programming tools to limit BIOS corruption opportunities. The capacity of External Storage device 110 is typically substantially greater than the capacity of BIOS Storage 114. For example, External Storage 110 will generally have a capacity measured at least in gigabytes, while BIOS Storage 114 may be restricted to a few megabytes. The interfaces (e.g., Advanced Technology Attachment, Small Computer Systems Interface, Universal Serial Bus, Fiber Channel, etc.) coupling External Storage device 110 to the remainder of system 100 are software controlled, rendering the device 110 inaccessible until system 100 software is running. On the other hand, in order to boot the system 100, the BIOS Storage 114 is accessible sans software support.

BIOS program 122 comprises a user interface program that allows the computer user to access and modify various operational settings of the system 100. The BIOS program 122 provides a graphical user interface having a unified look and feel that is easily customizable. Graphical interface processing in BIOS program 122 is partitioned into three components. The Graphical Engine 116 comprises processing routines 128, i.e., code and logic that generate graphically enhanced BIOS user interface displays. The look and feel module 120 specifies the appearance and behavior of the graphical elements included in user displays, and the data 126 comprises information, for example, character strings, presented to the user in the form of prompts, feedback, or other communication through the graphical interface.

Figure 2:
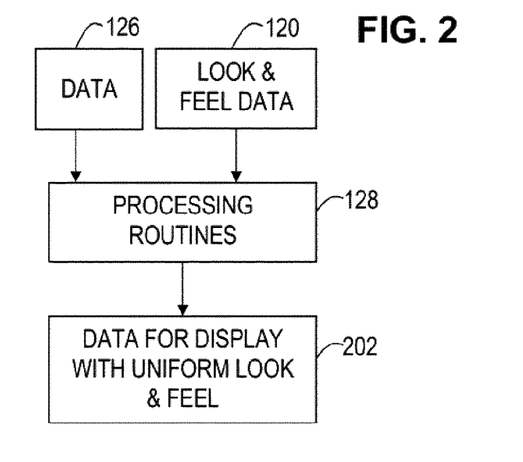
FIG. 2 shows a flow diagram for processing information and look and feel data to produce graphical BIOS displays having uniform look and feel in accordance with various embodiments.

As shown in FIG. 2, the raw data 126, and the look and feel data 120 that defines display appearance and behavior are provided to the processing routines 128. The processing routines 128 take the raw data 126 to display and transform the data 126 using the look and feel data 120 to produce displays having a uniform look and feel 202. By partitioning BIOS graphical data and processing into separate modules, embodiments provide all BIOS user prompts and information displays with a consistent look and feel while avoiding integration of look and feel information into the various user interaction components. Such integration makes look and feel changes more difficult, needlessly consumes engineering resources when such changes are required, and can easily result in differing look and feel across data components.

Embodiments comprising separate processing, data, and look and feel modules as described herein avoid such difficulties.

Referring again to FIG. 1, look and feel module 118 is included in external storage 110. By isolating look and feel data in a single module, embodiments allow the look and feel of the BIOS graphical displays to be changed without affecting the processing routines 128 or the data 126. For example, look and feel module 120 may be programmed into BIOS Storage 114 along with other components of BIOS Program 122 during manufacture. After manufacture, the look and feel of the BIOS graphical interface can be changed by substituting a new BIOS look and feel module 118 for use in place of look and feel module 120. Some embodiments change BIOS interface look and feel by writing a new look and feel module 118 to external storage 110. The size of graphics elements defining look and feel may necessitate storage in external storage 110 because of the relatively small size of BIOS storage 110. Other embodiments change BIOS look and feel by overwriting look and feel module 120 in BIOS Storage 114 with a new look and feel module. Thus, embodiments advantageously need not consider interface look and feel during BIOS software development. Design of the BIOS interface look and feel can be left to design professionals, and the resulting look and feel module 118, 120 integrated into system 100 after manufacture without affecting either BIOS firmware development or system manufacture.

The look and feel module 118, 120 comprises various images and control information that define the look and feel of the BIOS user interface. An embodiment of the look and feel module 120, for example, comprises: (1) background images and transparencies; (2) display area definitions, including size, position, background image and transparency, border image and transparency, and font parameters specifying size, color, spacing, and justification of characters within a display area; (3) images overlaying a background image and the overlay's position and transparency; (4) button images and transparencies, including images for display during button selection and images for display when the cursor passes over a button; (5) help information field width and behavior; (6) pop-up box background, border, transparencies, and font parameters; and (7) other parameters specifying the look and feel of the user interface.

BIOS program 122 embodiments providing user authentication, for example, embodiments supporting fingerprint scanning, may include look and feel elements directed to informing the user of the need for and the state of such validation. Such elements may include a fingerprint scan waiting image and transparency, a fingerprint scan accepted image and transparency, and a fingerprint scan error image and transparency.

Figure 3:
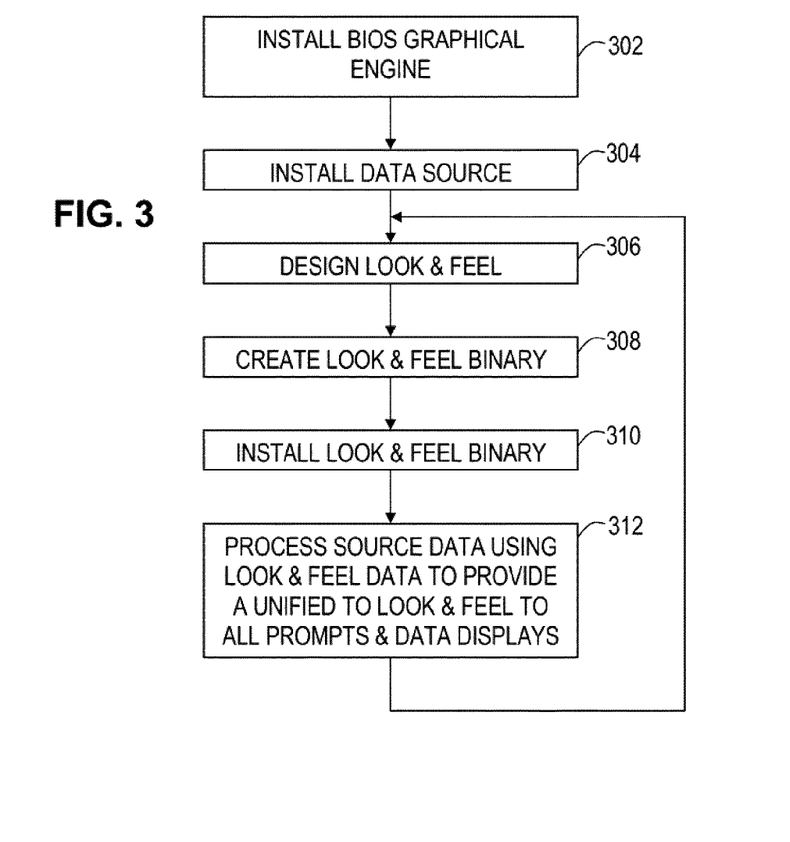
FIG. 3 shows a flow diagram for a method for providing a customizable unified look and feel for a BIOS graphical interface in accordance with various embodiments.

FIG. 3 shows a flow diagram for a method for providing a customizable unified look and feel for a BIOS graphical interface in accordance with various embodiments. Though depicted sequentially as a matter of convenience, at, least some of the actions shown can be performed in a different order and/or performed in parallel. In block 302, a BIOS graphical engine 116 is installed in a BIOS storage device 114. The BIOS graphical engine 116 generates the displays for the BIOS graphical user interface. The various data source components 126 that provide prompts or other information for display on the BIOS graphical user interface are installed in the BIOS storage device 114 in block 304. Neither the BIOS graphic engine 116, nor the data source components 126 define the look and feel applied to the BIOS graphical user interface displays.

In block 306, the look and feel of the BIOS graphical interface is designed. The timing of the look and feel design effort is not constrained by other aspects of the design or manufacture of the system 100 because the look and feel module 120 is not integrated into the BIOS graphical engine processing routines 128 or the data source components 126. In order to maximize the visual appeal of the BIOS graphical user interface, the look and feel may be designed by a design professional, such as a graphic designer, in conjunction with a set of guidelines for defining the look and feel elements, rather than by a software engineer or programmer. A conversion program processes a look and feel configuration file and the accompanying images supplied by the look and feel designer, in block 308, to create a look and feel binary module 120 suitable for use by the BIOS graphics engine 116. The look and feel module 120 contains all the relevant look and feel information to allow the BIOS graphics engine processing routines 128 to apply the look and feel to data 126 displayed for a user.

In block 310 the look and feel module 120 is installed in system 100. In some embodiments, the look and feel module 120 is installed in the BIOS storage device 114. In other embodiments, the look and feel module 118 is installed in the external storage device 110.

In block 312, the BIOS graphics engine's processing routines 128 process data 126, for example, prompts or other information displayed for a user, using look and feel data read from the look and feel module 120 to provide a BIOS graphical user interface having a unified look and feel. If a new look and feel is desired, the process continues with look and feel design in block 306. A new look and feel is installed, in block 310, without disturbing previously installed processing routines 128 or data 126. Thus, embodiments dissociate the design and installation of the BIOS graphical interface look and feel 120 from the design and installation of the BIOS graphical engine processing routines 128 and data components 126, simplifying design and adding flexibility to the BIOS user interface.

Figure 4:
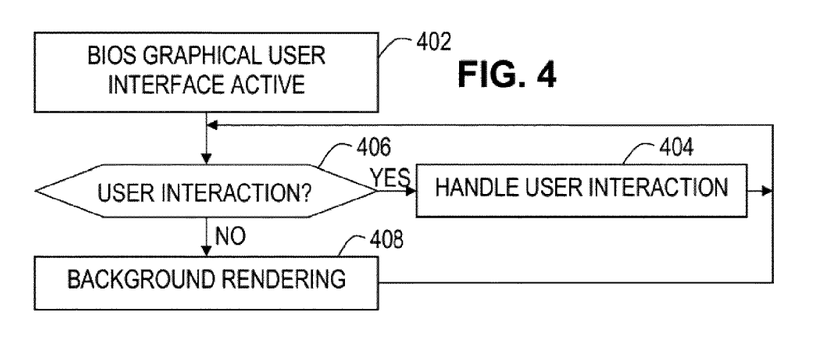
FIG. 4 shows a flow diagram for a method for background processing of BIOS graphical elements in accordance with various embodiments.

Preparing graphical elements for display, for example, applying shading or variable transparency is a time consuming process. In order to accelerate the display of graphical elements, embodiments of the BIOS graphical engine 116 employ background processing 124 to render graphical elements before the user desires to view those elements. FIG. 4 shows a flow diagram for a method for background processing of BIOS graphical elements in accordance with various embodiments. Though depicted sequentially as a matter of convenience, at least some of the actions shown can be performed in a different order and/or performed in parallel. In block 402, the BIOS graphical user interface is active. Graphical elements are displayed on display device 108 and the BIOS is available to respond to user interaction. The BIOS checks for user interaction in block 406. If the user is not interacting with the graphical interface, then the BIOS graphical engine performs background rendering in block 408.

During background rendering the BIOS graphical engine renders graphics elements not currently needed for display but likely to be displayed in the future. For example, an embodiment defines the various renderings of a graphical element as regular rendering, rollover rendering, activated rendering, and selected rendering. Regular rendering is the normal state for a rendered element when not selected, activated, or under a cursor (rolled over). Rollover rendering is the display state for a graphical element positioned underneath the moving cursor. For example, a rollover rendering may be highlighted. Selected rendering is the rendering required if an element can be selected and is currently selected. Activated rendering is needed if the element is in a state where its choices or logic are being used. For example, a pull-down menu is shown only when activated. When displaying a form (a graphical display with which a user interacts), all regular renderings of form elements must be completed before the form can be fully displayed. After the form is displayed, alternate renderings (e.g., rollover, selected, activated) of form elements may be processed in the background while awaiting user interaction. For example, alternative renderings of elements near the cursor may be needed for display before other elements, thus, an embodiment may deem elements nearest the cursor of highest priority and render those elements by background processing prior to rendering more remote elements. By pre-rendering graphical elements likely to be displayed in the near future, the BIOS graphical engine reduces the time between operator interaction and display update, thus making the interface more responsive to the user.

If a user interaction with the interface is detected in block 406, the user interaction is handled in block 404 and thereafter processing continues in block 406.

Figure 5:
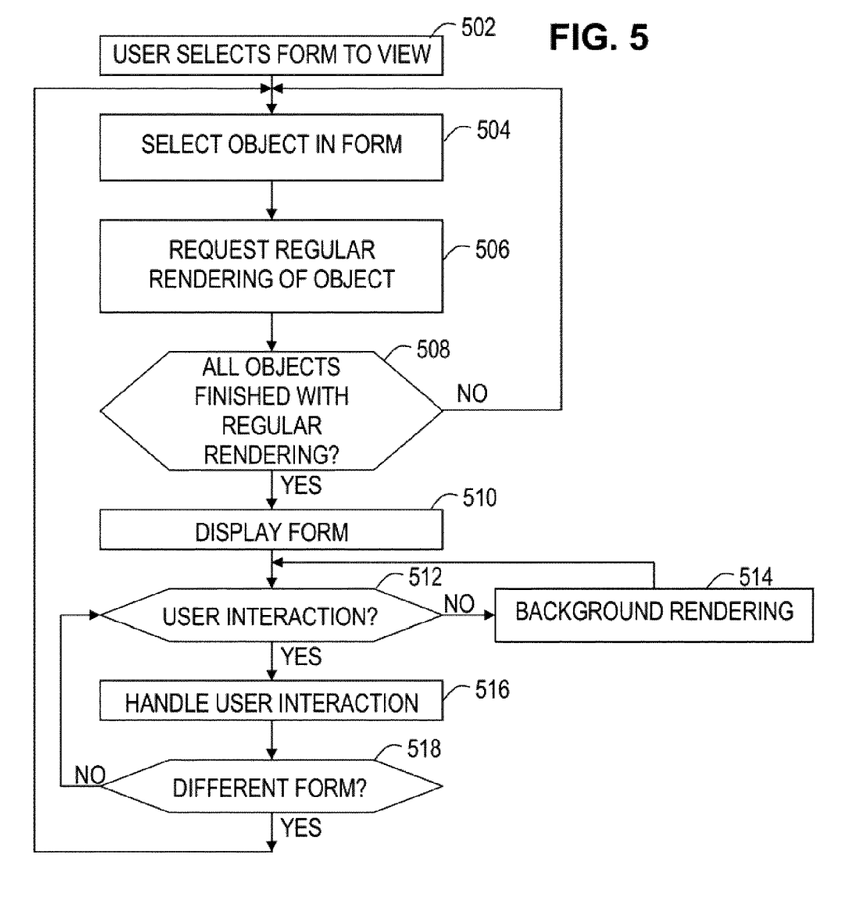
FIG. 5 shows a flow diagram for a method for rendering a BIOS graphical display in accordance with various embodiments.

FIG. 5 shows a flow diagram for a method for rendering a BIOS graphical display in accordance with various embodiments. Though depicted sequentially as a matter of convenience, at least some of the actions shown can be performed in a different order and/or performed in parallel. In block 502, a user interacts with the BIOS graphical interface by selecting a form to view. When a form is selected for display, all of the form's graphical elements (objects) for which regular renderings have not been previously created must be processed to provide regular renderings before the form can be fully displayed. In block 504, a form object is selected for regular rendering. The regular rendering of the object is performed in block 506. If, in block 508, all form object regular renderings have not been completed, an unrendered object is selected in block 504 and rendering continues. If, in block 508, regular renderings of all form objects are complete, then the form is displayed in block 510.

After displaying the form regular renderings in block 510, the interface is checked for user interaction in block 512. If no user interaction is detected, then background rendering is performed in block 514. Background rendering operates to render graphical elements likely to be displayed in the near future, such as rollover renderings of the form objects, during time intervals when the user is not interacting with the BIOS graphical interface. Background rendering 514 continues for at least a predetermined time interval before returning to block 512 to check for user interaction with the interface. If user interaction is detected in block 512, then the user interaction is handled in block 516. If the user interaction dictates display of a different form in block 518, then execution continues in block 502. If a new form is not required, polling for user interaction with the interface continues in block 512.

Figure 6:
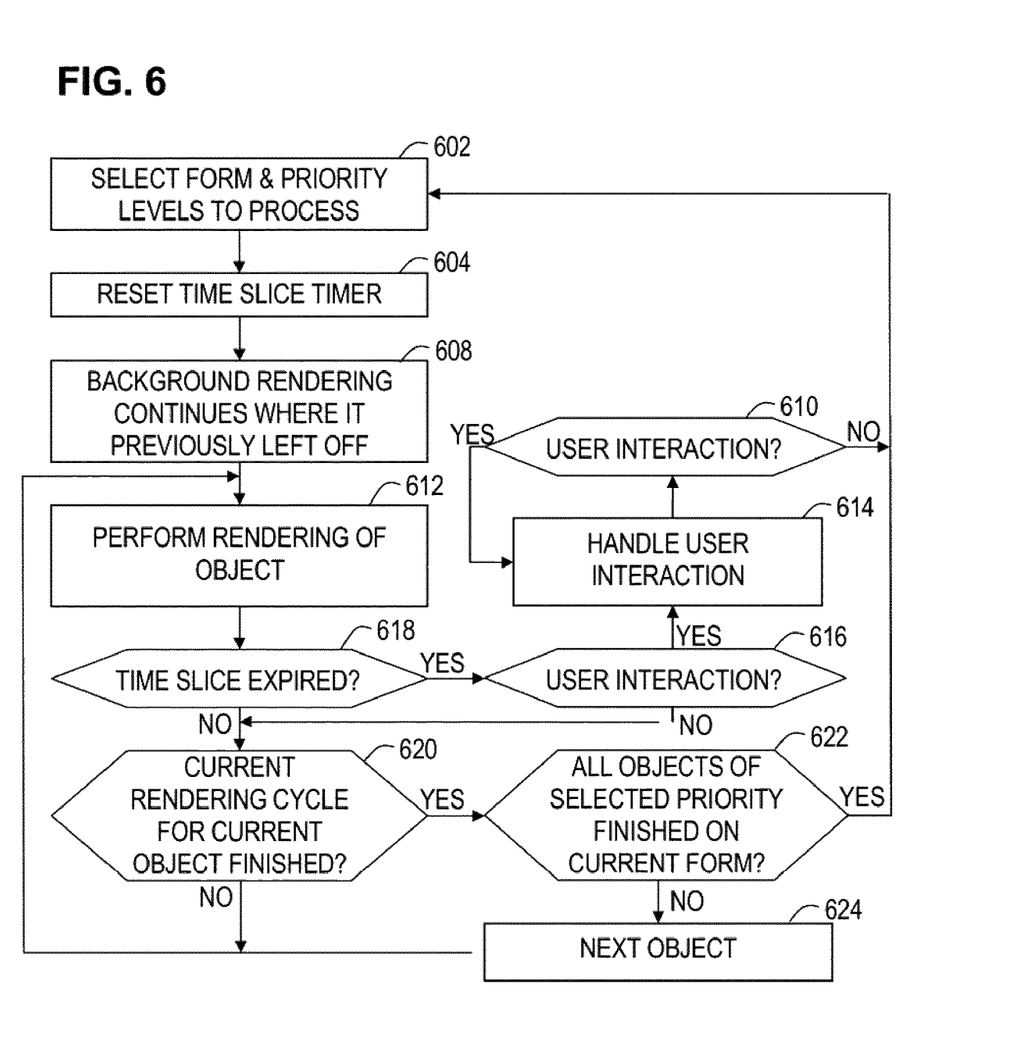
FIG. 6 shows a flow diagram for a method for background rendering of BIOS graphical elements in accordance with various embodiments.

FIG. 6 shows a flow diagram for a method for background rendering of BIOS graphical elements in accordance with various embodiments. Embodiments employ background rendering to pre-render versions of graphical elements not currently displayed. Background rendering, thus reduces the time required to display pre-rendered elements resulting in a more responsive user interface. Though depicted sequentially as a matter of convenience, at least some of the actions shown can be performed in a different order and/or performed in parallel. Background rendering begins in block 602 where a form and graphical element priority level are selected for processing. Processing priorities are assigned to the various renderings that may be displayed in accordance with the likelihood that those renderings will be displayed. An embodiment may, for example, assign rendering priority as follows: first priority (most likely to be displayed) to the activated rendering of a selected object in the current form, second priority to current form rollover renderings, third priority to current form selected renderings, fourth priority to regular renderings of forms that may be linked to from the current form ranked by proximity to a chosen item, such as a particular object, in the current form.

Background rendering is performed in time slices (intervals) of relatively short duration. In block 604, a timer used to measure background rendering time is reset. Rendering of the selected form and priority continues, in block 608, at a point where rendering stopped in any previous session. Embodiments of the BIOS graphical engine 116 keep track of the renderings previously performed for each graphical element, and whether a user interaction dictates that a previously rendered element be re-rendered. This tracking allows background rendering of the selected form to resume with selection of an unrendered object of the requested priority. In block 612, rendering of the selected object is initiated and when complete the rendering is stored for future display.

The background rendering timer is checked in block 618. If the timer has not expired, then the current rendering is checked for completion in block 620. If the rendering cycle initiated in block 612 did not result in a finished rendering of the object because the rendering is sub-divided into multiple processing steps, then rendering of the object continues in block 612. If the object rendering is found to be complete in block 620, and all objects of the selected priority on the current form are found to have been rendered in block 622, then background rendering continues in block 602 with selection of a form and priority for rendering. If objects on the current form and of the selected priority remain to be rendered in block 622, then, in block 624, a next object is selected for rendering, and background rendering continues in block 612.

If, in block 618, the background rendering timer is found to have expired, then, in block 616, user interaction with the interface is checked. If the user has not interacted with the interface, then background processing continues in block 620 where current object rendering is checked for completion. If, on the other hand, the user has interacted with the interface, then the user interaction is handled in block 614. After the user interaction is processed, polling for further user interaction occurs in block 610. If user interaction is detected, then handling takes place in block 614. If no user interaction is detected, then background rendering continues with selection of a form and priority in block 602.

Figure 7:
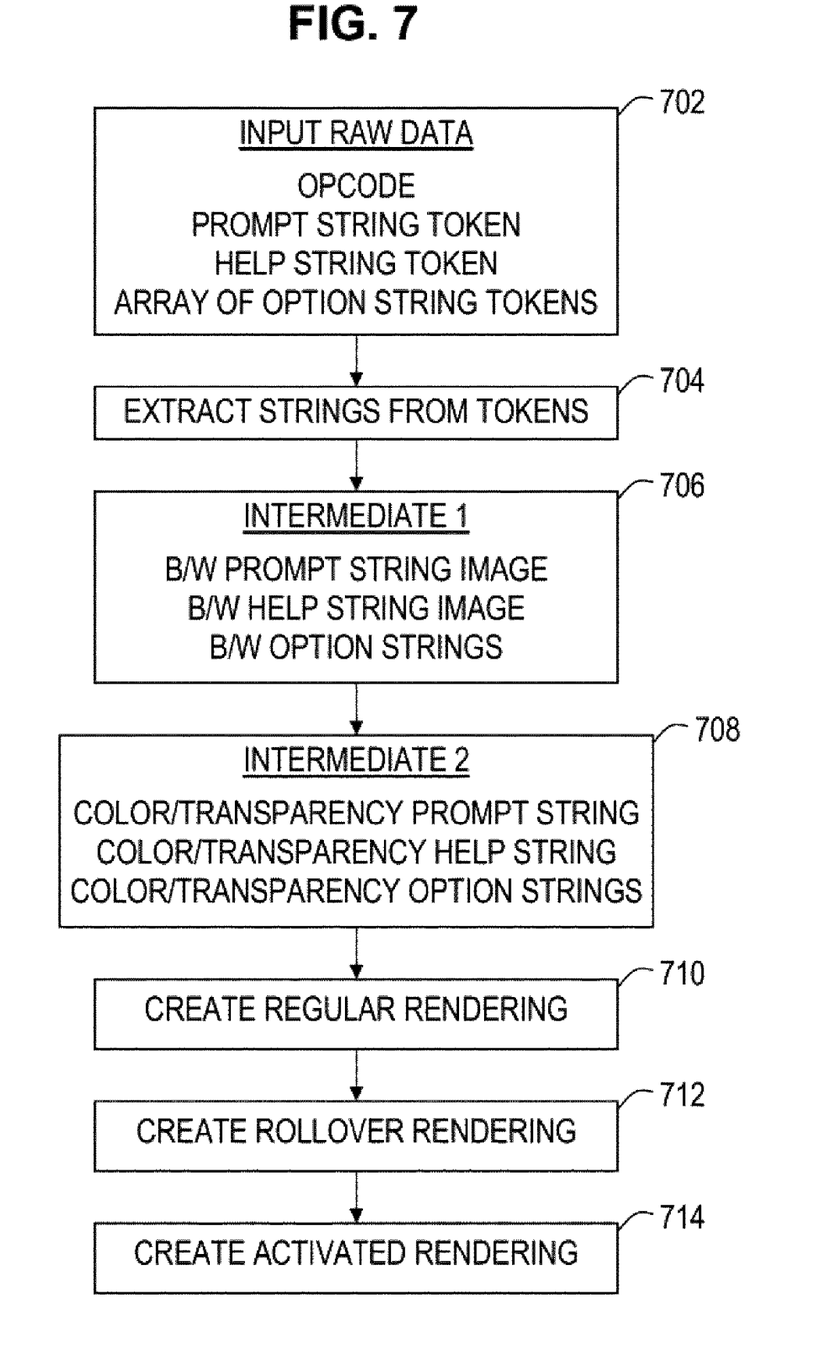
FIG. 7 shows a flow diagram for a method using background processing to produce renderings of an object in accordance with various embodiments.

FIG. 7 shows a flow diagram for a method using background processing to produce renderings of an object in accordance with various embodiments. Though depicted sequentially as a matter of convenience, at least some of the actions shown can be performed in a different order and/or performed in parallel. The actions shown in FIG. 7 consider renderings of a single object. An embodiment may perform one or more of the depicted actions during a background rendering time interval. Other embodiments may partition a depicted action across multiple background rendering time intervals. An object embodiment may require more or fewer renderings than illustrated. Embodiments of the present disclosure are not limited to any number of renderings, but rather encompass any number of renderings required to produce a BIOS graphical user interface.

In block 702, raw input data comprising an operation code (opcode), a prompt string token, a help string token, and an array of option string tokens are provided to the background processing 124. The opcode specifies the rendering to be performed. Each token comprises a character string. The strings are extracted from the tokens in block 704. In block 706, the first intermediate processing stage, black and white images of each character string are rendered. The font applied to the character string may be provided by look and feel module 120.

In intermediate processing stage 2, block 708, the black and white character string renderings of block 706 are colorized and transparency is added in accordance with, for example, parameters specified in look and feel module 120. The regular rendering of the object is created in block 710. The regular rendering is the object rendering displayed when the object is not selected, activated or underneath a cursor. Regular renderings of all form objects are needed to completely display the form. In block 712, the rollover rendering of the object is generated. The rollover rendering is displayed when the cursor is over the object. Finally, in block 714, the activated rendering of the object is created. The activated rendering is displayed when the objects choices or logic are being used, such as pull-down menu options being displayed only when the object is activated. Embodiments render each object in accordance with the look and feel information contained in look and feel module 120, 118 to provide BIOS displays having a unified look and feel.

Figure 8:
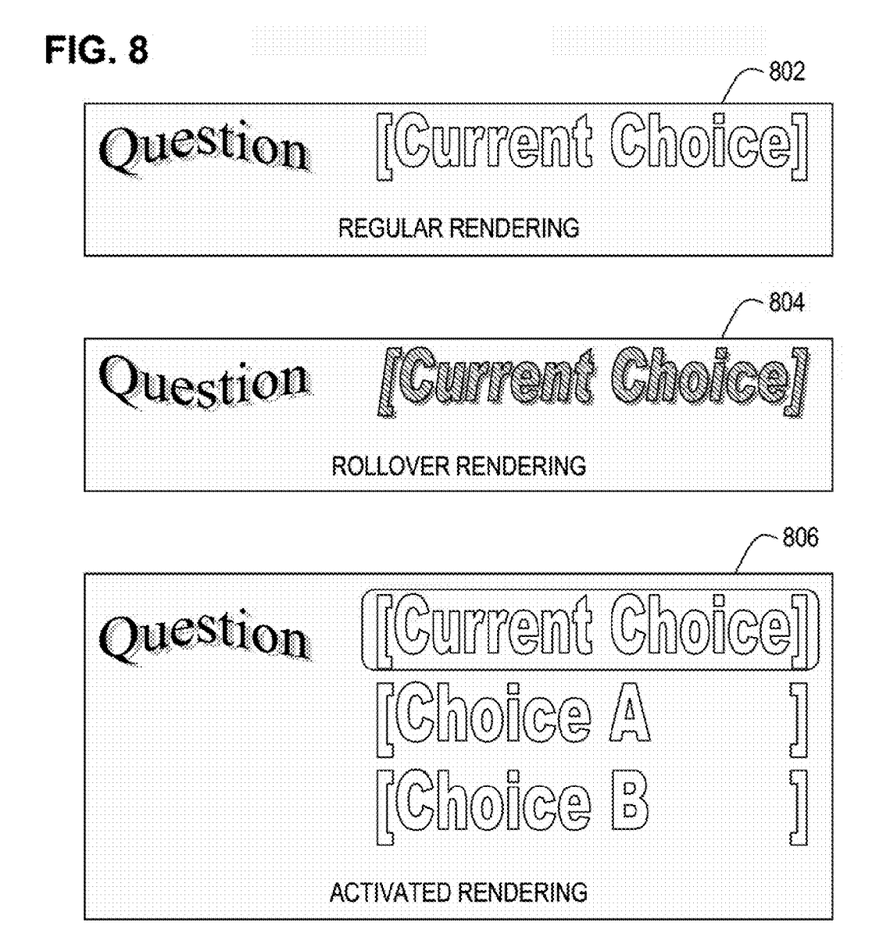
FIG. 8 shows examples of several object renderings in accordance with various embodiments.

FIG. 8 shows examples of several object renderings in accordance with various embodiments. An exemplary regular rendering 802, an exemplary rollover rendering 804, and an exemplary activated rendering 806 are shown as created in blocks 710, 712, and 714 respectively.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   - a Basic Input/Output System ("BIOS") graphical engine stored at a first storage location; and
   - a BIOS graphics look and feel module stored at a second storage location and separate from the BIOS graphical engine, the BIOS graphics look and feel module comprises a look and feel definition that defines the appearance and behavior of BIOS graphical user interface displays presented to a user before an operating system acquires control of the system, wherein
   - the BIOS graphical engine transforms information to be displayed for a user in accordance with the look and feel definition to provide a uniform appearance and behavior to graphical displays provided to the user, and
   - the BIOS graphical engine re-renders a previously rendered graphical element if a change in the graphical element is detected.

2. The computer system of claim 1, wherein installation of the BIOS graphics look and feel module is independent of the BIOS graphical engine installation.

3. The computer system of claim 1, wherein changing the BIOS graphical look and feel module changes the appearance and behavior of graphical displays.

4. The computer system of claim 1, wherein the BIOS graphics look and feel module provides at least one display attribute selected from a group consisting of a background image, a background transparency, a font character size, a font character color, a font character spacing, a font character outline color, and a font character outline thickness.

5. The computer system of claim 1, wherein the BIOS graphics look and feel module provides at least one display attribute selected from a group consisting of a border image, a border image transparency, a border image rotation, a button image, a button image transparency, a button selected image, a button selected image transparency, a button rollover image, and a button rollover image transparency.

6. The computer system of claim 1, wherein the BIOS graphics look and feel module provides at least one display attribute selected from a group consisting of a fingerprint waiting image, a fingerprint waiting image transparency, a fingerprint accepted image, a fingerprint accepted image transparency, a fingerprint error image, and a fingerprint error image transparency.

7. The computer system of claim 1, wherein the BIOS graphical engine comprises background processing that renders graphical elements not immediately required for display during time intervals when the user is not interacting with the BIOS graphical interface.

8. The, computer system of claim 7, wherein the BIOS graphical engine performs background processing of graphical elements according to the probability that an element will be displayed sooner than other elements.

9. A method, comprising:
   executing, using a processor, a BIOS graphical engine that generates a BIOS graphical user interface;
   executing, using the processor, a BIOS data component that produces information for display to a user on the BIOS graphical user interface, the BIOS data component is separate from the BIOS graphical engine;
   retrieving, using the processor, a look and feel definition that defines the appearance and behavior of a BIOS graphical interface display from a BIOS graphics look and feel module, the look and feel module is separate from the BIOS graphical engine and the BIOS data component;
   processing, using the processor, in the BIOS graphical engine, the look and feel definition retrieved from the look and feel module and information provided by the BIOS data component to produce a BIOS graphical user interface display containing the information and having appearance and behavior determined by the look and feel definition; and
   re-rendering, using the processor, a previously rendered graphical element if a change in the element is detected.

10. The method of claim 9, further comprising changing the look and feel of the BIOS graphical user interface by installing a BIOS graphics look and feel module in a computer system without reinstalling the BIOS graphical engine or the BIOS data component.

11. The method of claim 9, further comprising executing a transformation program to convert an image defining the look and feel of the BIOS graphical user interface into a look and feel module.

12. The method of claim 9, further comprising processing information provided by a plurality of BIOS data components in accordance with the look and feel definition retrieved from the look and feel module to provide a unified look and feel to all BIOS graphical user interface displays.

13. The method of claim 9, further comprising rendering graphical elements not immediately required for display at times when the user is not interacting with the graphical interface (background rendering).

14. The method of claim 13, further comprising selecting a graphical element for background rendering based on the likelihood that the element will be displayed sooner than other elements.

15. A system, comprising:
   means for defining the look and feel of a computer BIOS graphical interface;
   means for rendering a graphical display for a computer BIOS, wherein
   the rendering means and the defining means are separate components, and the rendering means processes all BIOS data to be displayed in accordance with the defining means to provide a consistent appearance and behavior to BIOS graphical displays, and
   the rendering means re-renders a previously rendered graphical element if a change in the graphical element is detected.

16. The system of claim 15, further comprising a means for creating graphical renderings in the background that creates graphical renderings not immediately needed for display during time intervals when a user is not interacting with the graphical interface.

17. The system of claim 15, further comprising a means for ranking an undisplayed graphical rendering in accordance with the estimated time until the rendering will be displayed.

* * * * *

UNITED STATES PATENT AND TRADEMARK OFFICE
CERTIFICATE OF CORRECTION

PATENT NO. : 8,305,386 B2
APPLICATION NO. : 12/747571
DATED : November 6, 2012
INVENTOR(S) : Kurt D. Gillespie et al.

Page 1 of 1

It is certified that error appears in the above-identified patent and that said Letters Patent is hereby corrected as shown below:

In the Claims:

In column 9, line 16, in Claim 8, delete "The," and insert -- The --, therefor.

Signed and Sealed this
Fourteenth Day of May, 2013

Teresa Stanek Rea
*Acting Director of the United States Patent and Trademark Office*